(12) United States Patent
 Suga

(10) Patent No.: US 12,095,956 B2
(45) Date of Patent: Sep. 17, 2024

(54) IMAGE FORMING APPARATUS USING A NON-CONTACT OPERATION FOR CHANGING A POWER MODE

(71) Applicant: CANON KABUSHIKI KAISHA, Tokyo (JP)

(72) Inventor: Daisuke Suga, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/501,414

(22) Filed: Nov. 3, 2023

(65) Prior Publication Data
US 2024/0155061 A1    May 9, 2024

(30) Foreign Application Priority Data
Nov. 4, 2022   (JP) .................................. 2022-177153

(51) Int. Cl.
*H04N 1/00*      (2006.01)
(52) U.S. Cl.
CPC ..... *H04N 1/00411* (2013.01); *H04N 1/00896* (2013.01)
(58) Field of Classification Search
None
See application file for complete search history.

(56) References Cited

U.S. PATENT DOCUMENTS

| | | | |
|---|---|---|---|
| 11,068,108 B2 | 7/2021 | Murayama | |
| 2011/0054360 A1* | 3/2011 | Son | A61B 5/1126 600/595 |
| 2012/0113018 A1* | 5/2012 | Yan | G06F 3/04883 345/173 |
| 2014/0267130 A1* | 9/2014 | Hwang | G06F 3/04883 345/173 |
| 2016/0219174 A1* | 7/2016 | Umeda | H04N 1/00896 |
| 2019/0286280 A1* | 9/2019 | Kuribayashi | G06F 3/0425 |
| 2020/0319750 A1 | 10/2020 | Murayama | |
| 2021/0377402 A1* | 12/2021 | Kohara | G06F 3/0416 |
| 2022/0236851 A1* | 7/2022 | Yamada | G06F 3/044 |
| 2023/0087711 A1* | 3/2023 | Kirihara | H04N 1/00381 715/863 |
| 2023/0229267 A1* | 7/2023 | Kimura | G06F 3/14 345/174 |

* cited by examiner

*Primary Examiner* — Henok Shiferaw
(74) *Attorney, Agent, or Firm* — Canon U.S.A., Inc. IP Division

(57) ABSTRACT

An image forming apparatus configured to form an image on a recording medium includes a display unit configured to display a setting for image forming by the image forming apparatus, a first detection unit configured to detect contact of a user's finger with a surface of the display unit, and a second detection unit configured to detect the user's finger at a position a predetermined distance away from the surface in a perpendicular direction to the surface, wherein the display unit being turned off is turned on in response to detection of the user's finger by the second detection unit.

5 Claims, 5 Drawing Sheets

IMAGE FORMING APPARATUS USING A NON-CONTACT OPERATION FOR CHANGING A POWER MODE

FIELD

The present disclosure relates to an image forming apparatus provided with an operation unit that can be operated in a contact manner.

DESCRIPTION OF THE RELATED ART

Conventionally, a contact operation in which a user operates an operation unit by touching a touch panel or a button has been widely used on the operation unit of an image forming apparatus.

In recent years, for an image forming apparatus provided with an operation unit that receives such a contact operation, there has been an increasing demand for solutions that allow the operation unit to be operated without touching a touch panel, a button, or the like in order to avoid a contact operation that could be a source of pathogen infection.

In U.S. Pat. No. 11,068,108, an input device is discussed that receives a specific non-contact operation performed on an operation screen.

On the input device for receiving a non-contact operation discussed in U.S. Pat. No. 11,068,108, a user performs a non-contact operation by operating an operation object at a predetermined height from a display screen, however. Thus, there is a possibility that a reliable operation feeling cannot be obtained in a non-contact operation compared with a contact operation in which a user directly touches a touch panel or the like, so that providing for not only the non-contact operation but also the contact operation may be required depending on the user. For this reason, it is desirable that an operation unit of an image forming apparatus receives both of a contact operation and a non-contact operation.

However, it may be necessary to perform a contact operation on an operation unit that receives both of a contact operation and a non-contact operation as described above in order to turn on a screen of the operation unit that has been turned off in a sleep mode or the like. In the above-described case, a user who wants to perform a non-contact operation may be required to first perform a contact operation, for example.

SUMMARY

Various embodiments of the present disclosure are directed to the provision of an image forming apparatus that can turn on an operation unit in a turn-off state by a non-contact operation.

According to one embodiment of the present disclosure, an image forming apparatus configured to form an image on a recording medium includes a display unit configured to display a setting for image forming by the image forming apparatus, a first detection unit configured to detect contact of a user's finger with a surface of the display unit, and a second detection unit configured to detect the user's finger at a position a predetermined distance away from the surface in a perpendicular direction to the surface, wherein the display unit being turned off is turned on in response to detection of the user's finger by the second detection unit.

Further features of the present disclosure will become apparent from the following description of exemplary embodiments with reference to the attached drawings.

DESCRIPTION OF THE EMBODIMENTS

Exemplary embodiments of the present disclosure will be described in detail with reference to the attached drawings. Unless otherwise specifically described, sizes, materials, shapes, and relative arrangements of components set forth in the below-described exemplary embodiments are not intended to limit the scope of the present invention.

<Image Forming Apparatus>

Figure 1:
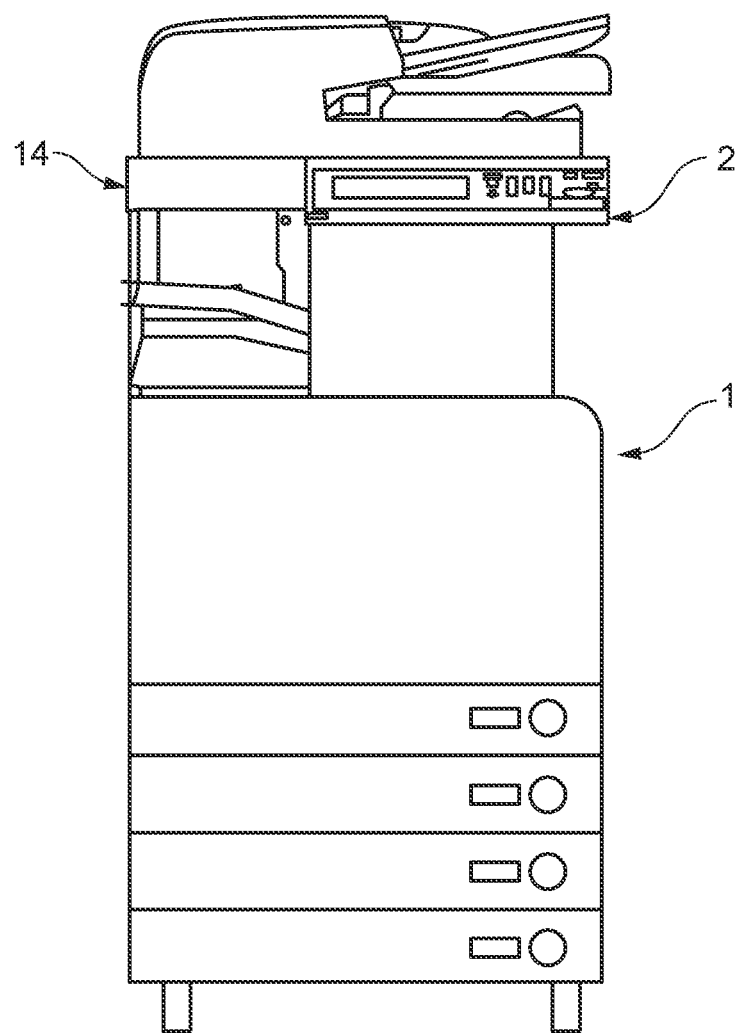
FIG. 1 illustrates an example of an image forming apparatus.

An image forming apparatus according to a first exemplary embodiment is to be described with reference to FIG. 1. FIG. 1 illustrates an example of an image forming system provided with the image forming apparatus.

As illustrated in FIG. 1, the image forming system includes an image forming apparatus 1 that forms an image on a sheet S (not illustrated) as a recording medium and a reader 14 that optically reads an image on a document placed on a glass surface (not illustrated) and converts the read image into image data. A processing apparatus 16 that performs processing such as stapling, punching, and bookbinding on the sheet S on which the image is formed by the image forming apparatus 1 can be added as an option.

The image forming apparatus 1 includes a seesaw type or tactile type main body power switch that turns main power supply on and off.

The image forming apparatus 1 is provided with an operation panel 2 that includes a display 21 that can display a display image received from the image forming apparatus 1 and a touch panel 22 that detects a touch operation from a user. The user touches a key (an input unit or a button) displayed on the display 21 with a finger to perform input or the like, and thus can perform a setting related to image formation, such as the number of images to be formed and a size of the sheet S, and a setting related to image reading, such as a size of a document. In addition to the touch panel 22, a key operation input unit 25 for a user to set the image forming apparatus 1 and to issue a job command is provided on the operation panel 2.

The image forming apparatus 1 includes an image forming unit 15 that forms an image on the sheet S. The image forming unit 15 includes photosensitive drums Y, M, C, and K, charging devices Y, M, C, and K, and developing devices Y, M, C, and K. The image forming unit 15 includes primary transfer rollers Y, M, C, and K, laser scanner units Y, M, C, and K, an intermediate transfer belt, a secondary transfer roller, and a secondary transfer counter roller.

In a case where the image forming apparatus 1 forms an image, first, an image forming job is input to a main body control unit 10. Accordingly, the sheet S stored in a sheet cassette is sent to a secondary transfer portion formed by the secondary transfer roller and the secondary transfer counter roller.

Meanwhile, in the image forming unit 15, first, a surface of the photosensitive drum Y is charged by the charging device Y. Then, the laser scanner unit Y irradiates the surface of the photosensitive drum Y with laser light according to image data of a document read by the reader 14 or image data transmitted from an external device (not illustrated) via a network and forms an electrostatic latent image on the surface of the photosensitive drum Y.

The developing device Y causes yellow toner to adhere to the electrostatic latent image formed on the surface of the photosensitive drum Y to form a yellow toner image on the surface of the photosensitive drum Y. The toner image formed on the surface of the photosensitive drum Y is primarily transferred to the intermediate transfer belt by a primary transfer bias applied to the primary transfer roller Y.

Magenta, cyan, and black toner images are also formed on the photosensitive drums M, C, and K in a similar process. The primary transfer bias is applied to the primary transfer rollers M, C, and K, and thus these toner images are superimposedly transferred onto the yellow toner image on the intermediate transfer belt. Accordingly, a full-color toner image corresponding to an image signal is formed on a surface of the intermediate transfer belt.

Then, the intermediate transfer belt rotates, and the full-color toner image is transferred to the secondary transfer portion. A secondary transfer bias is applied to the secondary transfer roller in the secondary transfer portion, so that the full-color toner image on the intermediate transfer belt is transferred to the sheet S. The sheet S to which the toner image is transferred is conveyed to a fixing device 13 by a conveyance belt. The fixing device 13 performs heating and pressing processing to fix the toner image to the sheet S.

The sheet S to which the toner image is fixed is conveyed to the processing apparatus 16. In a case where a user specifies processing such as stapling, punching, and bookbinding, the sheet S conveyed to the processing apparatus 16 is subjected to the specified processing and is then discharged to a discharge tray. In a case where a user does not specify processing or the processing apparatus 16 is not connected, the sheet S is directly discharged to the discharge tray without being processed.

<System Configuration of Image Forming Apparatus>

Figure 2:
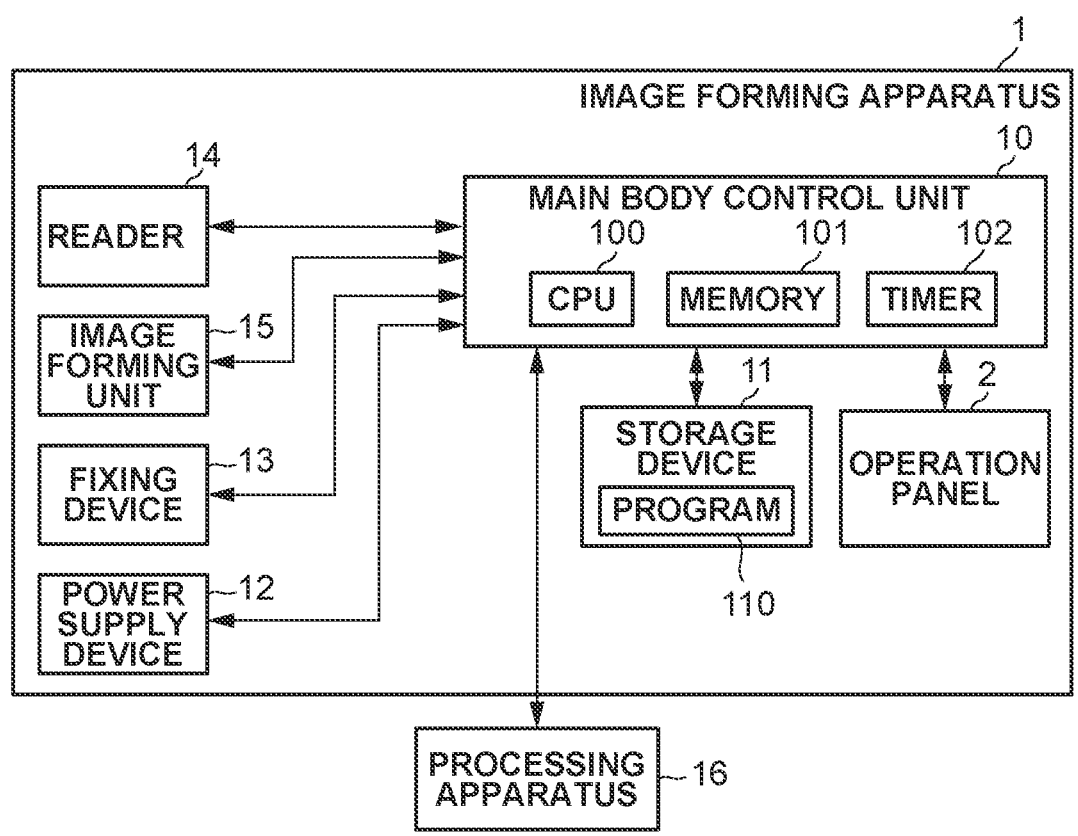
FIG. 2 is a block diagram illustrating an example of a system configuration of the image forming apparatus.

A system configuration of the image forming apparatus 1 is to be described with reference to FIG. 2. FIG. 2 is a block diagram illustrating an example of the system configuration of the image forming apparatus 1.

As illustrated in FIG. 2, the image forming apparatus 1 is provided with the main body control unit 10 that includes a central processing unit (CPU) 100, a memory 101, and a timer 102. The main body control unit 10 is connected to a storage device 11, the reader 14, the image forming unit 15, the operation panel 2, and others. The processing apparatus 16 can be added as an option for the purpose of extending the function. The main body control unit 10 (CPU 100) controls an operation of each connected unit.

The reader 14 reads a document and generates image data. The image forming unit 15 executes image forming processing for forming an image on a sheet based on the image data. The processing apparatus 16 performs processing such as stapling, punching, and bookbinding on a printed material, such as a sheet on which the image forming processing has been performed.

Various programs 110 related to control of the image forming apparatus 1, various display images, and print data are stored in the storage device 11. The various programs 110 stored in the storage device 11 are software groups that the main body control unit 10 executes to perform various types of processing. The various display images stored in the storage device 11 are the display images (image data) to be displayed on the operation panel 2 and the like.

The CPU 100 reads and executes the program 110 stored in the storage device 11. The CPU 100 reads the display image to be displayed on the operation panel 2 from the storage device 11 and transmits the display image to the operation panel 2. The memory 101 temporarily stores data associated with execution of the program 110 by the CPU 100. In other words, while using the memory 101 as a work area based on the program 110 stored in the storage device 11, the CPU 100 controls the reader 14, the image forming unit 15, and the processing apparatus 16 connected to the main body control unit 10 and executes processing such as forming an image on a sheet. For example, the CPU 100 performs image processing on image data read by the reader 14 from a document based on the program 110. The CPU 100 stores the image data thus generated in the storage device 11, transfers the image data to the image forming unit 15, and executes image forming processing.

The timer 102 is used for timing in a case where the main body control unit 10 performs various types of processing. For example, the main body control unit 10 determines to shift the image forming apparatus 1 from a standby mode to a screen turn-off mode with less power consumption according to a count value of the timer 102. After shifting the image forming apparatus 1 to the screen turn-off mode, the main body control unit 10 determines to shift the image forming apparatus 1 from the screen turn-off mode to a sleep mode with less power consumption according to the count value the timer 102. The main body control unit 10 may perform processing for directly shifting the image forming apparatus 1 to the sleep mode, in which the power consumption is less than that in the standby mode, without going through the screen turn-off mode. In other words, the standby mode corresponds to a first power mode. The screen turn-off mode and the sleep mode correspond to a second power mode.

The main body control unit 10 is connected to a power supply device 12. The power supply device 12 receives power supply from a commercial power source via an outlet plug, converts the power into power to be used by each device, and supplies the power to each device.

<Various Power Modes in Image Forming Apparatus>

In the image forming apparatus 1, the main body control unit 10 (CPU 100) performs control to reduce the power consumption according to an operation mode.

The image forming apparatus 1 can be shifted to the standby mode (first power mode) and to the screen turn-off mode (second power mode) in which the power consumption is less than that in the standby mode. The image forming apparatus 1 can be further shifted to the sleep mode (third power mode) in which the power consumption is less than that in the screen turn-off mode.

In a case where the image forming apparatus 1 is in the standby mode, the power supply device 12 supplies power to the main body control unit 10. Then, the power supply device 12 supplies power to the reader 14, the image forming unit 15, the processing apparatus 16, and the operation panel 2 in response to an instruction from the main body control unit 10. Even when the image forming apparatus 1 is in the standby mode, the power supply device 12 supplies power to a device in use and does not supply power to a device not in use in response to the instruction from the main body control unit 10. For example, in a case where a user selects image reading, the power supply device 12 supplies power to the reader 14, but does not supply power to the image forming unit 15 or the processing apparatus 16.

In a case where the image forming apparatus 1 is not used for a certain period of time, the image forming apparatus 1 is shifted from the standby mode to the screen turn-off mode with less power consumption. When the image forming apparatus 1 is in the screen turn-off mode, the power consumption is reduced by turning off backlight or screen display of the display 21 on the operation panel 2 in response to the instruction from the main body control unit 10. In a case where the image forming apparatus 1 is not used for a longer time, the image forming apparatus 1 is shifted to the sleep mode in which the power consumption is less than that in the screen turn-off mode. The image forming apparatus 1 is also shifted to the sleep mode in a case where an instruction to shift the image forming apparatus 1 to the sleep mode is received from a user via the operation panel 2. In a case where the image forming apparatus 1 is shifted from the standby mode to the sleep mode, the power supply device 12 stops supplying power to the reader 14, the image forming unit 15, and the processing apparatus 16, to which power is supplied during the standby mode in response to the instruction from the main body control unit 10. The power consumption is reduced by turning off the backlight or screen display of the display 21 on the operation panel 2 in response to the instruction from the main body control unit 10.

In a case where the operation panel 2 detects an input from a user in the screen turn-off mode or the sleep mode, the image forming apparatus 1 is returned to the standby mode from the screen turn-off mode or the sleep mode. In a case where an instruction to return the image forming apparatus 1 from the sleep mode is received from a user in the sleep mode, the image forming apparatus 1 is similarly returned to the standby mode.

<Configuration of Operation Panel>

A configuration of the operation panel 2 is to be described with reference to FIGS. 3A, 3B, and 4. FIG. 4 is a block diagram illustrating an example of a system configuration of the operation panel 2.

As illustrated in FIG. 4, the operation panel 2 is provided with a panel control unit 20 that includes a CPU 200, a read-only memory (ROM) 201, a random access memory (RAM) 202, and a timer 203. The timer 203 times in a case where the panel control unit 20 performs various types of processing.

Data such as various programs related to control of the operation panel 2 is stored in the ROM 201 (storage unit). The CPU 200 performs various types of arithmetic processing based on a control program stored in the ROM 201. Data is temporarily stored in the RAM 202. In other words, the CPU 200 controls the display 21, a loudspeaker unit 23, a state display unit 24, and the like connected to the panel control unit 20 based on the control program stored in the ROM 201 while using the RAM 202 as a work area.

The ROM 201 is a storage unit in which information related to control, which is to be described below, is stored. Various programs related to the control of the operation panel 2, as well as information related to connection with the image forming apparatus 1, are stored in the ROM 201. The information related to the control includes information about establishment of a connection with the image forming apparatus 1 and information acquired from the image forming apparatus 1. The information acquired from the image forming apparatus 1 includes information about a state of the image forming apparatus 1, such as the standby mode, the sleep mode, and error detection, and count information, such as the number of printed sheets.

The display 21 is a display unit that can display information stored in advance in the ROM 201 (storage unit) or information received from the main body control unit 10. Thus, regarding an image to be output to the display 21, the CPU 200 can switch between outputting an image stored in the operation panel 2 and outputting an image received from the main body control unit 10.

The display unit, and the touch panel 22, which is an operation unit that detects a touch operation by a user, are arranged to be superimposed on the display 21, and the user can perform an operation by touching the display 21 via the touch panel 22 with a finger. The display 21 displays a screen to the user through the touch panel 22. In other words, the display 21 and the touch panel 22 correspond to the display unit. The touch panel 22 is connected to the panel control unit 20 via a touch panel control unit 220 and detects a position on the display 21 to which the user inputs an instruction. The touch panel control unit 220 generates first detection information indicating that a user's finger 31 touches the touch panel 22 and first position information indicating the position on the display 21 to which the user inputs the instruction, and transmits the generated information to the panel control unit 20. In other words, the touch panel 22 and the touch panel control unit 220 correspond to a first generation unit.

The operation panel 2 includes the key operation input unit 25 separately from the touch panel type display 21 as an operation display unit. The key operation input unit 25 is a hard key provided in an area other than the display 21 on the operation panel 2. The key operation input unit 25 includes a key and a numeric keypad for starting a job of the image forming apparatus 1.

The operation panel 2 includes a non-contact operation unit formed of a frame body 29 and a non-contact sensor 28. Although details are to be described below, the non-contact operation unit can detect the user's finger 31 on a detection surface L2 separated by a predetermined distance in a perpendicular direction, which is a direction perpendicular to a detection surface L1 of the touch panel 22. A non-contact sensor control unit (not shown) is connected to the touch panel control unit 220, generates second detection information based on detection of the user's finger 31 by the non-contact sensor 28 and second position information indicating a position of the user's finger 31 on the detection surface L2, and transmits the second detection information to the panel control unit 20. In other words, the non-contact sensor 28 and the non-contact sensor control unit correspond to a second generation unit.

The panel control unit 20 issues a command to the touch panel control unit 220 or the non-contact sensor control unit and thus can switch an operation between operating the touch panel 22 in a touch operation mode (first detection mode) and operating the touch panel 22 in a non-contact operation mode (second detection mode). Switching the operation can be performed using an electrostatic capacitance type touch panel or the like. In a case where an electrostatic capacitance type touch panel is used for operating the touch panel in the touch operation mode, the user's finger 31 is detected according to a change in capacitance on the surface of the touch panel 22.

<User Operation Detection Position>

Figure 3A:
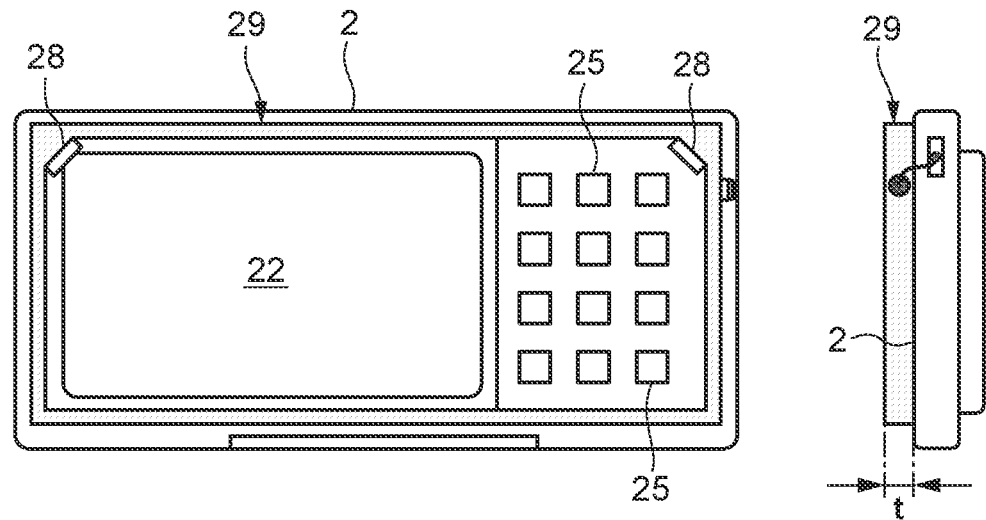
FIGS. 3A and 3B illustrate a user operation detection position in each detection mode of an operation panel.
Figure 3B:
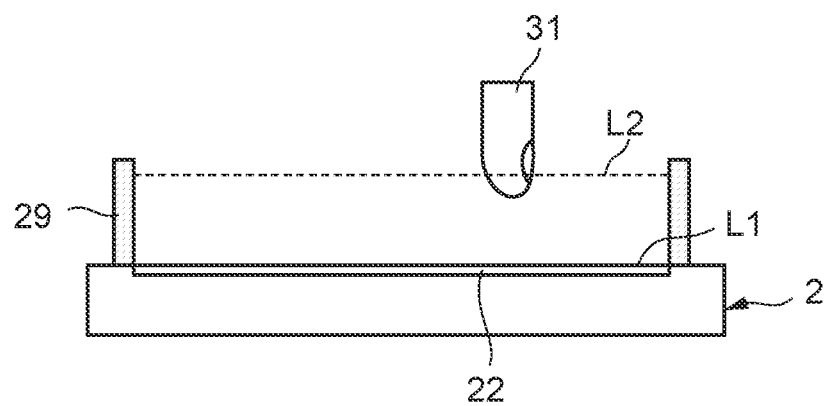
Figure 4:
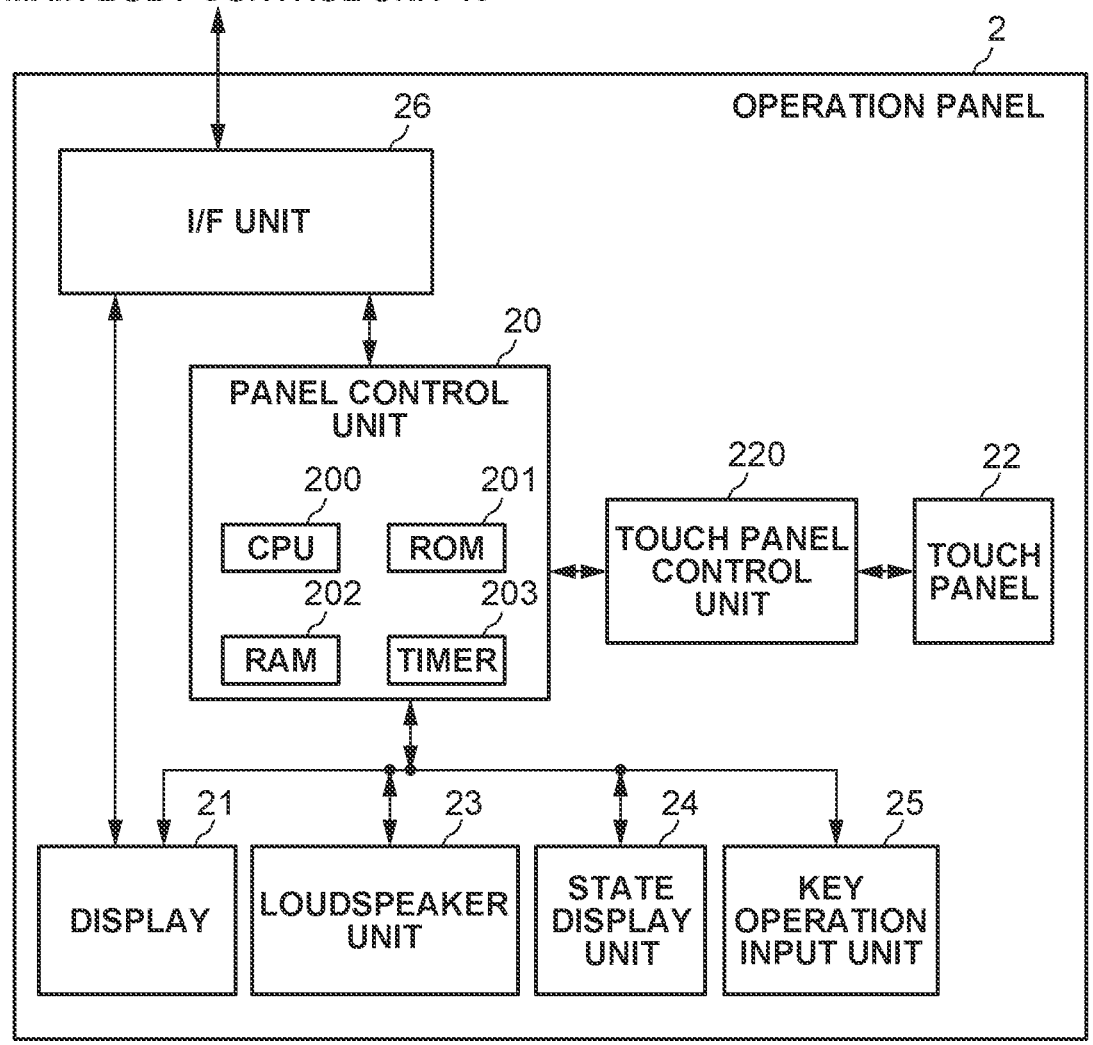
FIG. 4 is a block diagram illustrating an example of a system configuration of the operation panel.

FIGS. 3A and 3B illustrate a user operation detection position on the operation panel 2 in each detection mode. In a case where the touch panel control unit 220 in the operation panel 2 is set to the touch operation mode (first detection mode), the touch panel 22 detects a user operation on the detection surface L1 on the surface of the touch panel 22. In a case where the touch panel control unit 220 is set to the non-contact operation mode (second detection mode), the non-contact sensor 28 detects the user operation on the detection surface L2 located farther from the detection surface L1 on the surface of the touch panel 22. In other words, the detection surface L2 is an area overlapping the touch panel 22 in a transverse direction and a longitudinal direction of the touch panel 22. The non-contact sensor 28 detects presence of the user's finger 31 in the area.

Operation Detection Flow According to First Exemplary Embodiment

Figure 5:
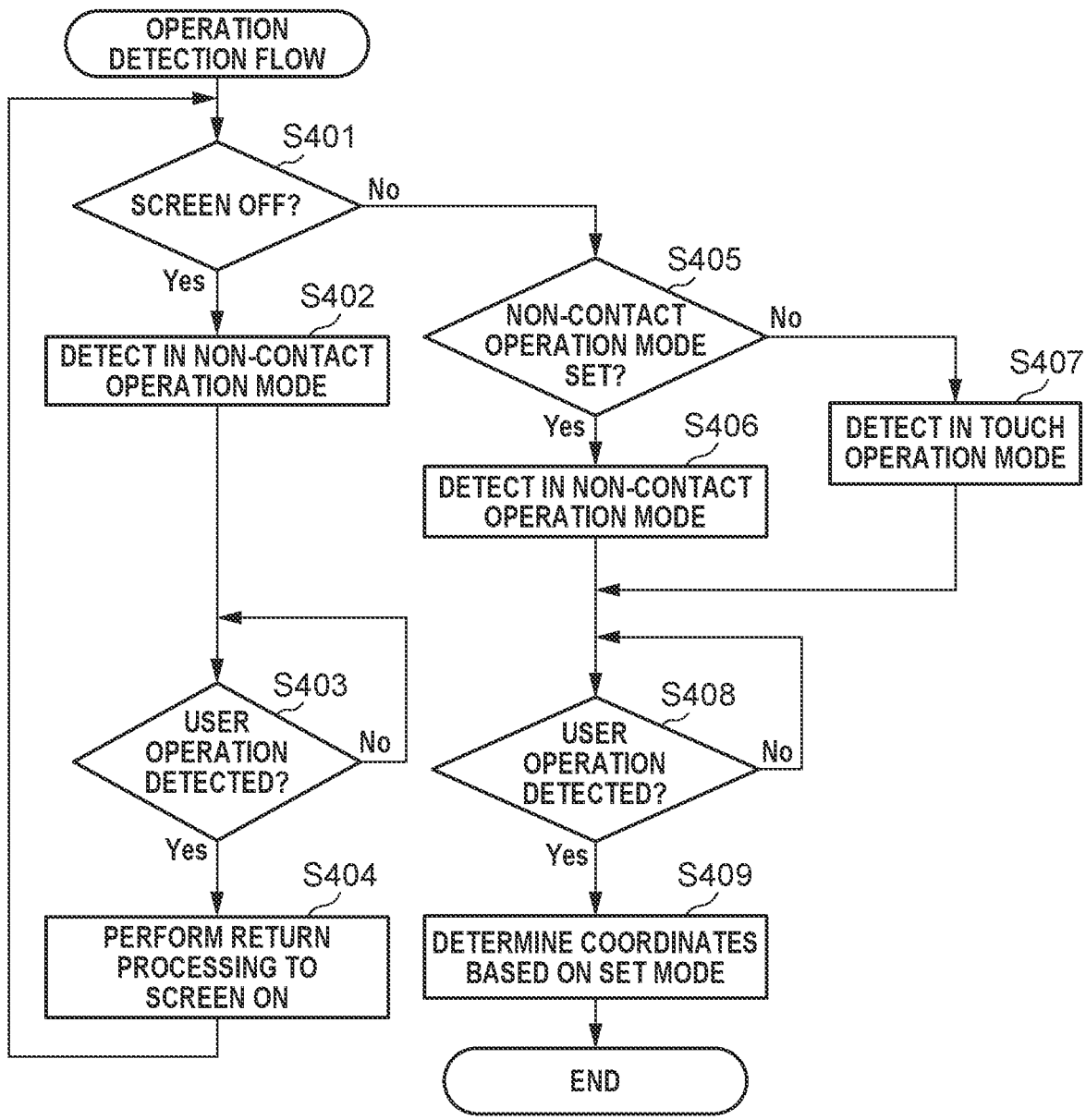
FIG. 5 is a flowchart illustrating an operation detection flow.

Control for detecting a user operation on the touch panel 22, which is a feature of various embodiments of the present disclosure, is to be described. FIG. 5 is a flowchart illustrating processing executed by the CPU 100 of the main body control unit 10 according to the first exemplary embodiment to detect a user operation.

It is assumed that the image forming apparatus 1 is started up by a user, and the touch panel control unit 220 in the operation panel 2 is set to the touch operation mode (first detection mode) or the non-contact operation mode (second detection mode).

In step S401, the CPU 100 determines whether the screen of the display 21 is off. In a case where the image forming apparatus 1 is in the standby mode, the screen is on. In a case where the image forming apparatus 1 is in the screen turn-off mode or the sleep mode, the screen is off. In a case where the screen of the display 21 is off (YES in step S401), the processing of the CPU 100 proceeds to step S402. In a case where the screen of the display 21 is on (NO in step S401), the processing of the CPU 100 proceeds to step S405.

Step S402 to be described below is a step that characterizes various embodiments of the present disclosure. In a case where the screen of the display 21 is off, in step S402, the CPU 100 instructs the operation panel 2 to set the operation panel 2 to the non-contact operation mode (second detection mode). Upon receiving the above-described instruction, the CPU 200 in the operation panel 2 transmits a command to set the non-contact operation mode (second detection mode) to the touch panel control unit 220. Regardless of whether the touch panel 22 is set to the touch operation mode (first detection mode) or the non-contact operation mode (second detection mode) before the screen is turned off, the non-contact operation mode (second detection mode) is set. A reason for this processing is so that a user who does not want to touch the touch panel 22 can start an operation without touching the touch panel 22.

In step S403, the CPU 100 determines whether the touch panel 22 detects a user operation in the non-contact operation mode (second detection mode). In a case where the user's finger reaches the detection surface L2 of the touch panel 22, the touch panel 22 detects the user operation. Then, the touch panel 22 notifies the CPU 100 via the CPU 200 that the user operation is performed. In a case where the user operation is detected (YES in step S403), the processing of the CPU 100 proceeds to step S404. In a case where the user operation cannot be detected (NO in step S403), the processing of the CPU 100 returns to step S403.

In step S404, the CPU 100 turns on the screen of the display 21 on the operation panel 2 and performs control to return to the standby mode. Regardless of whether the touch panel 22 is set to the touch operation mode (first detection mode) or the non-contact operation mode (second detection mode) before the screen is turned off, the non-contact operation mode (second detection mode) is set. A reason for this processing is that priority is given to enabling a user who does not want to touch the touch panel 22 to continue operation without touching the touch panel 22. However, after the screen of the display 21 is turned on by the non-contact operation, the operation panel 2 may be set to the touch operation mode. The processing of the CPU 100 returns to step S401.

In a case where it is determined that the screen is not off (NO in step S401), the processing of the CPU 100 proceeds to step S405. In step S405, the CPU 100 determines whether the user instructs the operation panel 2 to set to the touch operation mode (first detection mode) or the non-contact operation mode (second detection mode). In a case where it is determined that the user instructs setting to the non-contact operation mode (second detection mode) (YES in step S405), the processing of the CPU 100 proceeds to step S406. Whereas, in a case where it is determined that the user instructs setting to the touch operation mode (first detection mode) (NO in step S405), the processing of the CPU 100 proceeds to step S407. The user can instruct from the operation panel 2 whether to set the touch panel 22 to the touch operation mode or the non-contact operation mode.

In step S406, the CPU 100 instructs the operation panel 2 to set the operation panel 2 to the non-contact operation mode (second detection mode). Upon receiving the above-described instruction, the CPU 200 in the operation panel 2 transmits a command to set the non-contact operation mode (second detection mode) to the touch panel control unit 220. The processing of the CPU 100 proceeds to step S408. In step S407, the CPU 100 instructs the operation panel 2 to set the operation panel 2 to the touch operation mode (first detection mode). Upon receiving the above-described instruction, the CPU 200 in the operation panel 2 transmits a command to set the touch operation mode (first detection mode) to the touch panel control unit 220. The processing of the CPU 100 proceeds to step S408. In step S408, the CPU 100 determines whether the user operation is detected. In a case where the user operation cannot be detected (NO in step S408), the processing of the CPU 100 returns to step S408. In a case where the user operation can be detected (YES in step S408), the processing of the CPU 100 proceeds to step S409. In step S408, in a case where the non-contact operation mode (second detection mode) is set, the user operation is detected on the detection surface L2 of the touch panel 22. In a case where the touch operation mode (first detection mode) is set, the user operation is detected on the detection surface L1 of the touch panel 22.

In step S409, the CPU 100 determines coordinates specified by the user based on the set mode of the operation panel 2. In a case where the non-contact operation mode (second detection mode) is set, the coordinates specified by the operation on the detection surface L2 of the touch panel 22 are detected. In a case where the touch operation mode (first detection mode) is set, the coordinates specified by the operation on the detection surface L1 of the touch panel 22 are detected. An appropriate operation instruction is issued to the image processing device 1 based on the specified coordinates.

In a case where the CPU 100 finishes the operation detection flow and starts the next operation detection flow, the processing returns to step S401.

As described above, according to the present exemplary embodiment, an operation is detected in the non-contact operation mode while the screen on the display is off, and thus, a user who does not want to touch the screen can start the operation without touching the screen while the screen is off.

According to the present exemplary embodiment, the configuration in which the touch panel control unit 220 is controlled by the main body control unit 10 of the image forming apparatus 1 is described as the example, but a control source and an arrangement are not limited to this configuration. The panel control unit 20 may be configured to control the touch panel control unit 220.

Operation Detection Flow According to Second Exemplary Embodiment

An image forming apparatus according to a second exemplary embodiment of the present disclosure is to be described. According to the second exemplary embodiment, processing is performed according to the same flowchart illustrated in FIG. 5 as in the first exemplary embodiment. Parts that overlap with the first exemplary embodiment have the same processing and the same reference numerals, so the descriptions of the parts are omitted.

In contrast to the first exemplary embodiment, the second exemplary embodiment is characterized in that, in step S404, inquiry processing is added as to which of the touch operation mode (first detection mode) or the non-contact operation mode (second detection mode) is applied after return in the returning processing. For example, the display 21 displays "Please select either operating in the non-contact operation mode or operating in the touch operation mode", and a setting is performed according to an instruction from a user. Only the above-described processing is different, and the other processing is the same.

As described above, according to the present exemplary embodiment, a workload to change the non-contact operation to the touch operation can be reduced for a user who wants to perform the touch operation.

According to the present disclosure, an image forming apparatus in which an operation unit in a turn-off state can be turned on by a non-contact operation can be provided.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-177153, filed Nov. 4, 2022, which is hereby incorporated by reference herein in its entirety.

What is claimed is:

1. An image forming apparatus configured to form an image on a recording medium, the image forming apparatus comprising:
    a display configured to display a setting for image forming by the image forming apparatus;
    a first detector configured to detect contact of a user's finger with a surface of the display;
    a second detector configured to detect the user's finger at a position a predetermined distance away from the surface in a perpendicular direction to the surface; and
    a controller configured to control turning on and off of the display and to control a power mode of the image forming apparatus,
    wherein the controller changes the power mode at least into
        a first power mode in which an image can be formed,
        a second power mode in which power consumption is less than that in the first power mode, and
        a third power mode in which power consumption is less than that in the second power mode, and
    wherein the display being turned off is turned on in response to detection of the user's finger by the second detector in a case where the image forming apparatus is in the second power mode.

2. The image forming apparatus according to claim 1,
    wherein the controller controls the display to turn on based on a fact that the second detector detects the user's finger at the position the predetermined distance away from the surface in the perpendicular direction.

3. The image forming apparatus according to claim 1,
    wherein the first detector detects a position on the surface where the user's finger is in contact with the surface of the display, and
    wherein the second detector detects a position of the user's finger at the position the predetermined distance away from the surface in the perpendicular direction.

4. The image forming apparatus according to claim 1, wherein the first detector detects the user's finger in contact with the surface of the display based on a change in electrostatic capacitance.

5. The image forming apparatus according to claim 1,
    wherein the display is turned on in a case where the user's finger is located at a position of the predetermined distance away from the surface in the perpendicular direction in an area that overlaps the display in a transverse direction and in a longitudinal direction of the display.

* * * * *